United States Patent [19]

Smith

[11] Patent Number: 5,129,593
[45] Date of Patent: Jul. 14, 1992

[54] METHOD OF MAKING A SPOOL WOUND WITH OPTICAL FIBER

[75] Inventor: Ronald H. Smith, Chevy Chase, Md.

[73] Assignee: Optelecom, Inc., Gaithersburg, Md.

[21] Appl. No.: 586,008

[22] Filed: Sep. 21, 1990

[51] Int. Cl.⁵ .................. B65H 55/04; B65H 49/00
[52] U.S. Cl. .................. 242/159; 242/54 R; 242/128; 242/167
[58] Field of Search ........... 242/159, 166, 167, 172, 242/128, 54 R

[56] References Cited

U.S. PATENT DOCUMENTS

| | | | |
|---|---|---|---|
| 2,490,837 | 12/1949 | Scott, Jr. | 242/167 X |
| 4,903,607 | 2/1990 | Clark | 242/159 X |
| 4,925,125 | 5/1990 | LeCompte | 242/159 X |
| 4,967,980 | 11/1990 | Pinson | 242/159 X |
| 5,022,602 | 6/1991 | LoStracco | 242/159 |
| 5,022,603 | 6/1991 | Maree et al. | 242/167 |

FOREIGN PATENT DOCUMENTS 847102  6/1939  France .................. 242/167

*Primary Examiner*—Stanley N. Gilreath
*Attorney, Agent, or Firm*—Kerkam, Stowell, Kondracki & Clarke

[57] ABSTRACT

A method of making a spool wound with optical fiber where the spool has at least one payout end and providing, at the payout end of the spool, a wear-away adhesive coating or foam rubber flange. Where payout of optical fiber is from both the outer and inner layers of the wound spool, the optical fiber payout dynamics are regulated at both ends of the spool of the fiber.

4 Claims, 2 Drawing Sheets

DIRECTION OF MOVEMENT

METHOD OF MAKING A SPOOL WOUND WITH OPTICAL FIBER

BRIEF SUMMARY OF THE INVENTION

This invention relates to methods and means for regulating the payout dynamics of optical fibers from wound packs of the fiber.

Optical fiber payout packs of wound fibers for remote control of airborne vehicles are known. In the past, payout packs were wound in precision layers, with each turn of wound fiber supported by two underlying turns. Employing such a system, succeeding layers are shorter than the layer therebeneath.

Improvements resulting in increasing the volumetric efficiency are provided by winding the fiber between end flanges instead of having the fiber stop short of the end of an underlying layer, and stepping back a few turns before initiating a succeeding layer.

Winding the fiber into a pack between flanges of a spool and removing the flange at the payout end result in dramatic improvements in volumetric efficiency; however, there are drawbacks to such a system, such as: special techniques are required to maintain precision wind in the vicinity of the end flanges; further, during payout, the wound turns in an underlying layer are likely to be unraveled prematurely, caused by rubbing from the fiber paying out.

Further, the radius of curvature experienced by fiber at the point where payout is initiated (the peel point) is smaller when the peel point is in close proximity to the payout end of a wound pack. Thus, the bend radius reduction is caused by the reduced wound pack surface area, along which friction between the wound pack and fiber payout can occur. Such friction causes fiber elements at a slight distance from the peel point to be slowed down slightly. The tension force component with which fiber is pressed against the wound pack is not fully offset by centripetal force until the fiber has turned out of the peel point. The result is gradually decreasing friction force which tends to result in a peel point radius having only a modest effect on fiber stress. If the fiber pays out in the vicinity of a wound flange edge, the underlying surface which would normally moderate the peel point bend radius is absent, and a sharp bend induces a high stress and increases fiber breakage possibilities. These deficiencies are overcome by the present invention wherein the fiber is wound between two flanges of a spool in which the flange at the payout end is formed of a wear-away material. The wear-away flange may consist of a foam plastic material which is thick enough to produce a meaningful reduction in the peel point radius as the fiber paying out rubs on its outer periphery; and/or consist of a coating which is worn away by the action of the fiber paying out so that the disturbance of the payout helix relative to a free air case is minimal; or consist of a material wherein friction induced is large enough to beneficially influence the peel point radius, but small enough to avoid a significant increase in fiber tension.

Regulation of payout dynamics may beneficially combine use of such wear-away flanges; simultaneous payout from a plurality of wound packs and/or simultaneous payout from inside and outside of a given pack winding.

BRIEF DESCRIPTION OF THE SEVERAL VIEWS

Referring to the drawings illustrating embodiments of the present inventions:

Figure 3:
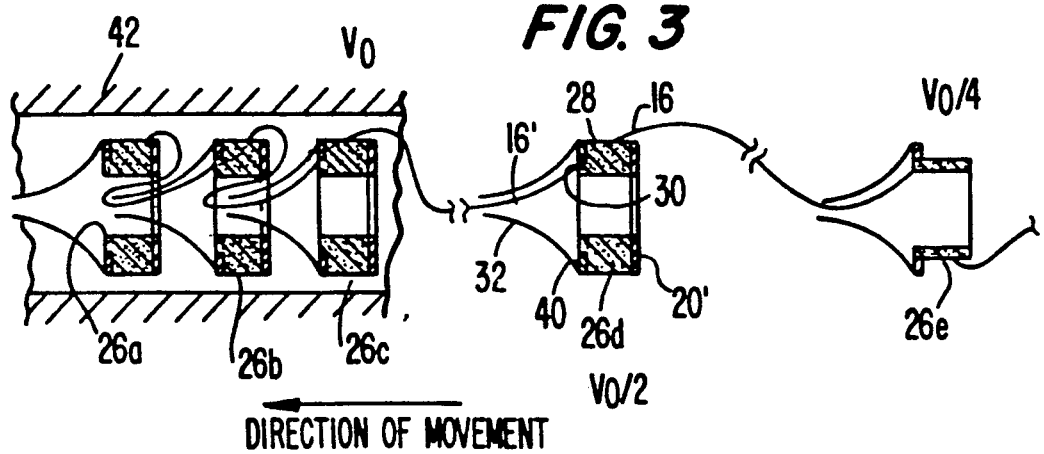
Figure 4A:
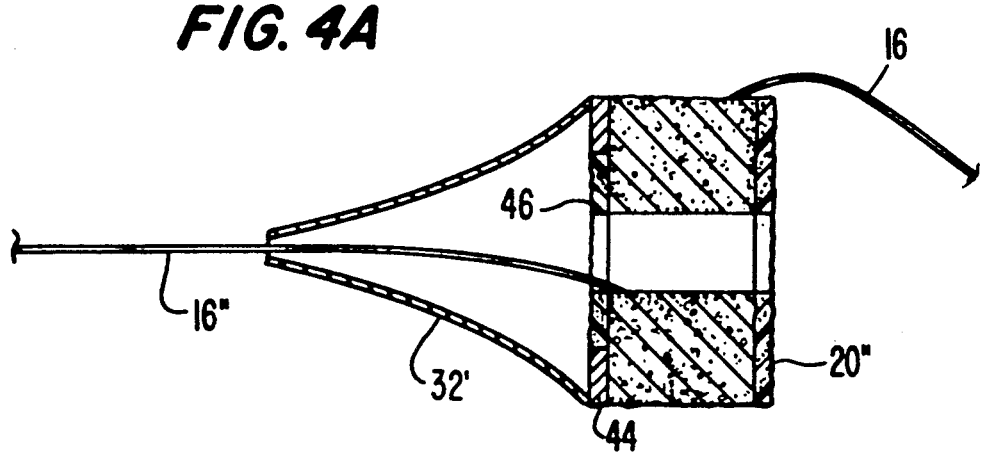
Figure 4B:
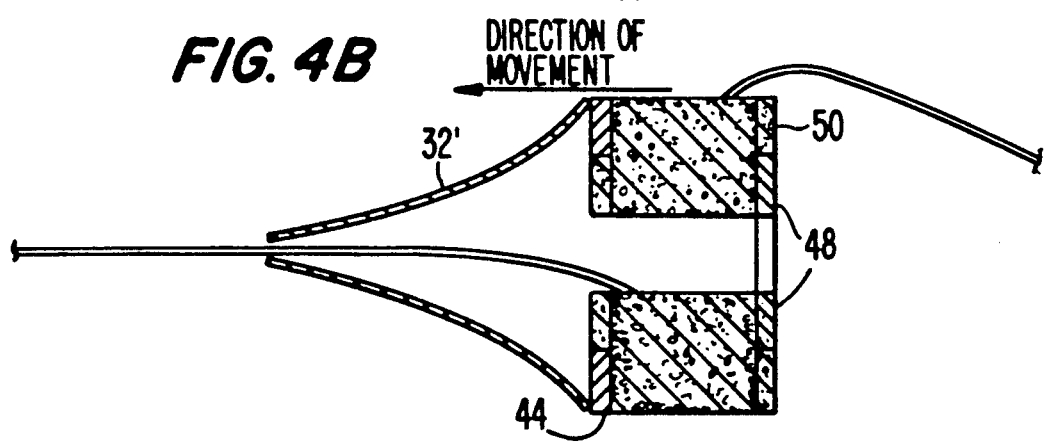
Figure 4C:
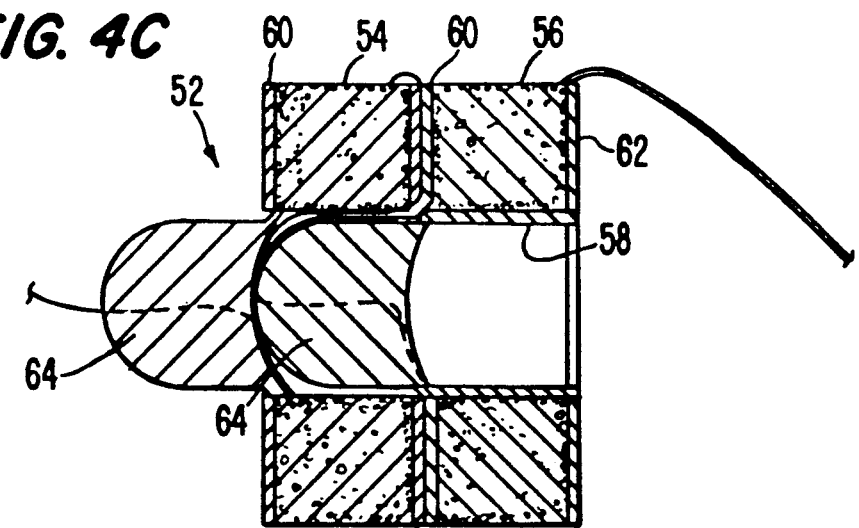
Figure 4D:
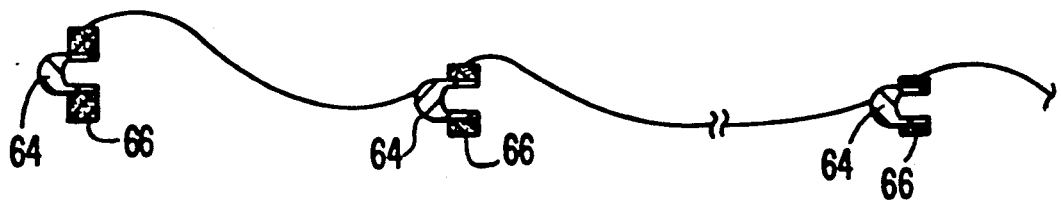

FIG. 3 schematically illustrates a series of connected fiber wound packs having inner and outer fiber payout configurations;

FIG. 4A is a sectioned view of an inner and outer payout system for optical fibers;

FIG. 4B is a sectional view of a modified inner and outer fiber payout pack winding;

FIG. 4C is a sectional view of a pair of spools and wound fiber packs, with the fiber of each pack being connected to a sensor device; and FIG. 4D schematically illustrates a series of spools and wound fiber optic packs and sensors being deployed.

DETAILED DESCRIPTION OF THE INVENTION

Figure 1:
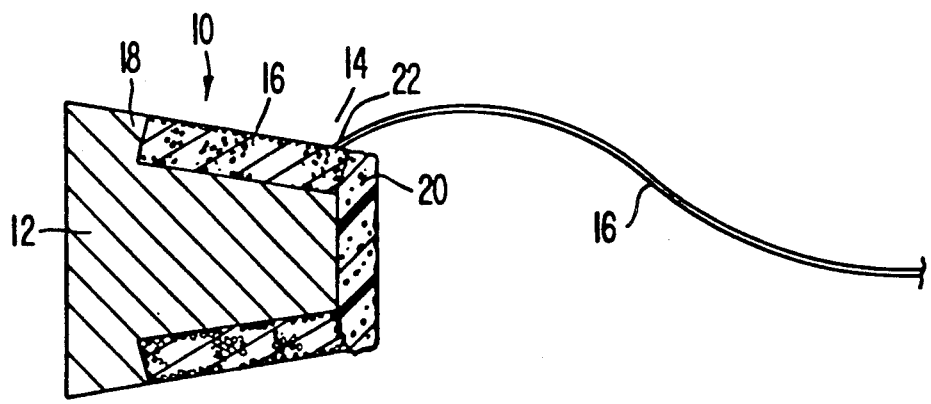
FIG. 1 is a sectional view illustrating fiber wound on a tapered spool configuration employing a wear-away flange.

Referring to FIG. 1 of the drawings, 10 generally designates a spool and wound optical fiber pack in which the spool or bobbin 12 is tapered toward the payout end of the pack, as at 14. The fiber 16 is wound between a rear fixed flange 18 and a wear away front flange 20. In this illustration, 22 designates the peel point for the fiber 16. The wear-away flange 20 comprises a foam plastic material, such as a polyethylene or polypropylene foam, having sufficient thickness to maintain some support for the optical fiber in the layers adjacent the flange.

As the fiber 16 pays out from the wound pack the outer periphery of the foam plastic wear-away flange 20 is worn away, decreasing its diameter.

Figure 2:
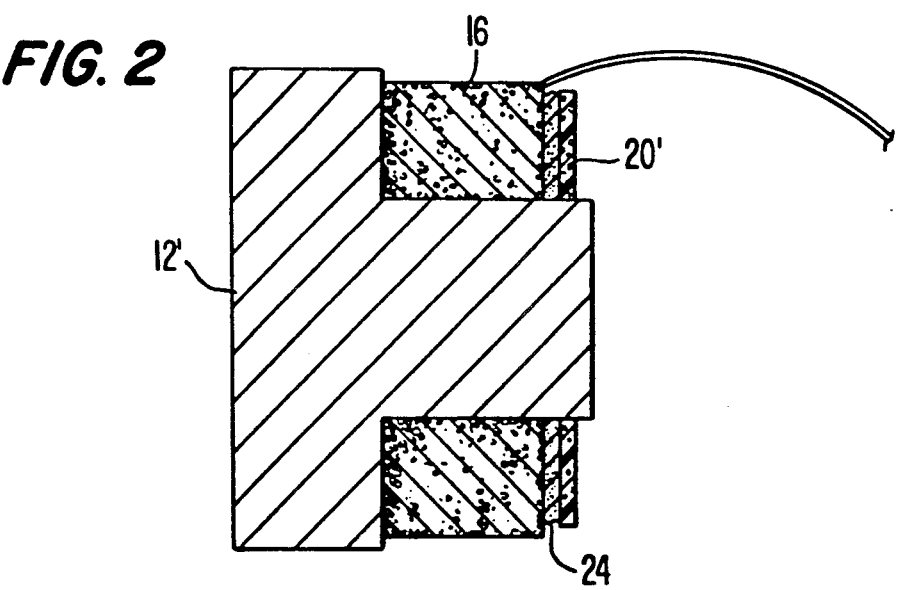
FIG. 2 is a sectional view illustrating another form of fiber wound on a nontapered spool.

Referring now to FIG. 2, the spool 12' is cylindrical, and the fiber 16 is wound into a pack on the spool with a removable flange not shown at the payout end thereof. After the fiber has been wound, a lubricant, indicated at 24, is applied to the exposed fiber winding, which lubricant may comprise a petroleum jelly. Downstream of the petroleum jelly is placed a wear-away foam plastic flange 20'. The foam flange 20' and the petroleum jelly 24 have been found to provide a particularly efficient system.

Referring now to FIG. 3, there is illustrated a series of wound packs 26a, b, c, d, and e. These wound packs 26a–e are of the type wherein fiber 16 is paid out from the outer surface 28, and simultaneously from the inner surface, as at 30. As a guide for the fiber paying out from the inner surface, each pack is provided with a conical-shaped fiber guide 32. Since fiber is to pay out from both the outer and inner surfaces of the pack, each pack is wound on a mandril having at least partial wear-away flanges at each end of the pack to provide the trailing end of the pack with a wear-away coating 20' and the forward end of the pack with a wear-away coating 40 to assist in supporting the pack of optical fiber prior to and during its deployment. After winding the pack, the mandril is removed. In this form of the invention where there are a series of packs 26a–e, higher deployment speeds are achieved wherein those packs not deployed are traveling full speed $V_o$ through the air in the missile body 42, whereas the first deployed pack 26d would be traveling, for example, at about $V_{o/2}$, and the end pack 26e would be paying out, for example, at about velocity $V_{o/4}$, as the fiber deployment is slowed due to air resistance.

Referring to FIG. 4A, an inside-outside deployment pack is illustrated, including the conical fiber guide 32', connected to a solid, nonwear-away flange 44, which surrounds approximately the outer one-half of wound fiber, and a wear-away flange 46, which supports the remainder of the wound fiber. At the trailing end of the wound fiber is a wear-away flange 20", which supports the wound fiber after the windings have been removed from a suitable winding mandril. In this view, the fiber unwinding from the outer surface is designated 16 and that from the inner winding 16".

With this configuration, the relative velocity of the optical fiber payout from the inner and outer portions of the pack are reduced from the velocity of the missile body.

In FIG. 4B, the cone 32' has connection to a hard flange 44, as described in reference to FIG. 4A, whereas the trailing surface of the wound pack is provided with a hard flange 48 at the inner portion of the pack winding, and a wear-away coating at the outer portion of the wound pack designated 50.

In reference to FIG. 4C, the assembly, generally designated 52, comprises at least a pair of packs of wound fiber 54 and 56. The packs are supported inwardly by rigid spools 58 and at each forward end by a hard flange 60. The trailing ends of the packs are provided with wear-away flanges 62 and, at the forward end, each pack has connection to a sensor 64. The end of the first-to-be-deployed pack 56 is optical fiber connected to the leading turn of the next-to-be-deployed optical fiber on pack 54.

FIG. 4D illustrates the deployment of a number of the aligned sensors 64 from packs of optical fibers, diagrammatically illustrated at 66.

I claim:

1. A method of making a spool wound with optical fiber, the steps comprising winding optical fiber on a spool between hard flanges at respective ends of the spool, and thereafter replacing at least a portion of one of the hard flanges with a material which is easily worn away by action of the fiber paying out over the one flange.

2. The method of making a spool wound with optical fiber, as defined in claim 1, the further step of replacing at least a portion of the other hard flange with the easily worn-away material.

3. The method of making a spool wound with optical fiber, as defined in claim 1, wherein the easily worn-away material is a firm plastic.

4. The method of making a spool wound with optical fiber, as defined in claim 3, the further step of applying a lubricant between the plastic material and the wound fiber.

* * * * *